United States Patent
Denzel et al.

(10) Patent No.: US 9,509,613 B1
(45) Date of Patent: Nov. 29, 2016

(54) MECHANISMS FOR DEADLOCK AVOIDANCE SUPPORT IN NETWORK FABRICS

(71) Applicant: International Business Machines Corporation, Armonk, NY (US)

(72) Inventors: Wolfgang E. Denzel, Langnau am Albis (CH); German R. Herrera, Adliswil (CH); Cyriel J. Minkenberg, Gutenswil (CH); Bogdan Prisacari, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/017,734

(22) Filed: Feb. 8, 2016

(51) Int. Cl.
*H04L 12/801* (2013.01)

(52) U.S. Cl.
CPC .................................... *H04L 47/12* (2013.01)

(58) Field of Classification Search
CPC ....... H04L 47/12; H04L 47/10; H04L 47/22; H04L 47/2483
USPC ............ 370/229, 230, 230.1, 235, 237, 351, 370/389, 395.1, 395.3
See application file for complete search history.

(56) References Cited

U.S. PATENT DOCUMENTS

| | | | |
|---|---|---|---|
| 8,934,377 B2 | 1/2015 | Kumar et al. | |
| 2003/0108030 A1* | 6/2003 | Gao ..................... | H04L 12/4633 370/351 |
| 2003/0210685 A1 | 11/2003 | Foster et al. | |
| 2014/0204735 A1* | 7/2014 | Kumar ................... | H04L 47/12 370/229 |

OTHER PUBLICATIONS

Choudhary; "Deadlock Free Routing in Irregular Interconnection Networks for Complex SoCs";International Journal of Engineering and Advanced Technology (IJEAT), vol. 1, Issue 2;Dec. 2011; pp. 131-136.
Daily, William J., and Charles L. Seitz. "Deadlock-free message routing in multiprocessor interconnection networks." Computers, IEEE Transactions on 100.5 (1987): 547-553.
Lopez, P.; Flich, J.; Duato, J., "Deadlock-free routing in InfiniBand/sup TM/ through destination renaming," Parallel Processing, 2001 International Conference on, vol., No., pp. 427-434, Sep. 3-7, 2001.
Sancho, J.C.; Robles, A.; Flich, J.; Lopez, P.; Duato, J., "Effective methodology for deadlock-free minimal routing in InfiniBand networks," Parallel Processing, 2002. Proceedings. International Conference on , vol., No., pp. 409,418, 2002.
Sancho, J.C.; Robles, A.; Lopez, P.; Flich, J.; Duato, J., "Routing in infiniBand™ torus network topologies," Parallel Processing, 2003. Proceedings. 2003 International Conference on, vol., No., pp. 509-518, Oct. 9, 2003.
Tor Skeie, Olav Lysne, Ingebjorg Theiss, "Layered Shortest Path (LASH) Routing in Irregular System Area Networks," Parallel and Distributed Processing Symposium, International, p. 0162, International Parallel and Distributed Processing Symposium: IPDPS 2.
Yoon et al.; "Virtual Channels and Multiple Physical Networks:Two Alternatives to Improve NoC Performance";IEEE Transactions on Computer-Aided Design of Integrated Circuits and Systems, vol. 32, No. 12;Dec. 2013; pp. 1906-1919.

* cited by examiner

*Primary Examiner* — Obaidul Huq
(74) *Attorney, Agent, or Firm* — Cantor Colburn LLP; David Quinn

(57) ABSTRACT

Disclosed herein is a method for deadlock avoidance in a network comprising partitioning in a module, a set of virtual lanes into deadlock avoidance virtual channels; where each deadlock avoidance virtual channel comprises a plurality of virtual lanes; assigning each incoming packet at the module to one of the deadlock avoidance virtual channels, and within the deadlock avoidance virtual channel to a virtual lane whose relative index corresponds to an absolute index of the virtual lane the packet would have been assigned to if the network was not provisioned with deadlock avoidance virtual channels; and transitioning each packet as it traverses the module from one deadlock avoidance virtual channel to another deadlock avoidance virtual channel when a deadlock avoidance policy so demands it.

17 Claims, 6 Drawing Sheets

MECHANISMS FOR DEADLOCK AVOIDANCE SUPPORT IN NETWORK FABRICS

BACKGROUND

This disclosure relates to mechanisms for deadlock avoidance support in network fabrics. In particular, this disclosure relates to mechanisms for deadlock avoidance support in Infiniband network fabrics, network on a chip (NoC) or a system on a chip (SoC).

InfiniBand (abbreviated IB), a computer-networking communications standard used in high-performance computing, features very high throughput and very low latency. Latency refers to a delay in packet delivery. InfiniBand is used for data interconnect both among and within computers. InfiniBand is also utilized as either a direct, or switched interconnect between servers and storage systems, as well as an interconnect between storage systems.

IB is a popular interconnect fabric architecture for High Performance Computing (HPC) systems. One of the main features of IB is the separation of network (switch/adapter) resources in independent virtual lanes that can be used for quality of service purposes. Several network topologies that are of interest in the HPC/Datacenter applications are vulnerable to deadlock (a complete cycle of dependencies between network resources that does not allow progress of traffic (e.g., packet delivery) anymore) and a general approach that is often used is to separate network resources into virtual channels and to enforce inside each switch a channel transition scheme that makes cycle occurrence impossible. Although already benefiting from independent resources (virtual lanes), IB switches have generally not offered support for such deadlock avoidance techniques and have been mostly used in the context of topologies that are intrinsically deadlock-free (such as fat tree topologies).

The increasing number of heterogeneous cores for general-purpose chip multiprocessors (CMP) and systems-on-chip (SoCs) leads to a complex variety of on-chip communication scenarios where multiple applications running simultaneously, trigger the exchange of various messages across processors, accelerators, cache memories, and memory controllers. Consequently, the next generation of networks-on-chip (NoC) should not only provide high performance and energy-efficient data delivery but also cooperate with the network interfaces of the embedded cores to meet special requirements such as message-class isolation and real-time data delivery.

SUMMARY

Disclosed herein is a method for deadlock avoidance in a network comprising partitioning in a module, a set of virtual lanes into deadlock avoidance virtual channels; where each deadlock avoidance virtual channel comprises a plurality of virtual lanes; assigning each incoming packet at the module to one of the deadlock avoidance virtual channels, and within the deadlock avoidance virtual channel to a virtual lane whose relative index corresponds to an absolute index of the virtual lane the packet would have been assigned to if the network was not provisioned with deadlock avoidance virtual channels; and transitioning each packet as it traverses the module from one deadlock avoidance virtual channel to another deadlock avoidance virtual channel when a deadlock avoidance policy so demands it.

Disclosed herein too is a computer program product comprising a non-transitory storage medium readable by a processing circuit and storing instructions for execution by the processing circuit for performing a method for deadlock avoidance in a network comprising partitioning in a module, a set of virtual lanes into deadlock avoidance virtual channels; where each deadlock avoidance virtual channel comprises a plurality of virtual lanes; assigning each incoming packet at the module to one of the deadlock avoidance virtual channels, and within the deadlock avoidance virtual channel to a virtual lane whose relative index corresponds to an absolute index of the virtual lane the packet would have been assigned to if the network was not provisioned with deadlock avoidance virtual channels; and transitioning each packet as it traverses the module from one deadlock avoidance virtual channel to another deadlock avoidance virtual channel when a deadlock avoidance policy so demands it.

Disclosed herein too is a network system comprising a plurality of modules; and a plurality of virtual lanes in operative communication with the modules; where the network system is operative to partition in a module, a set of virtual lanes into deadlock avoidance virtual channels; where each deadlock avoidance virtual channel comprises a plurality of virtual lanes; assign each incoming packet at the module to one of the deadlock avoidance virtual channels, and within the deadlock avoidance virtual channel to a virtual lane whose relative index corresponds to an absolute index of the virtual lane the packet would have been assigned to if the network was not provisioned with deadlock avoidance virtual channels; and transition each packet as it traverses the module from one deadlock avoidance virtual channel to another deadlock avoidance virtual channel when a deadlock avoidance policy so demands it.

DETAILED DESCRIPTION

Figure 1:
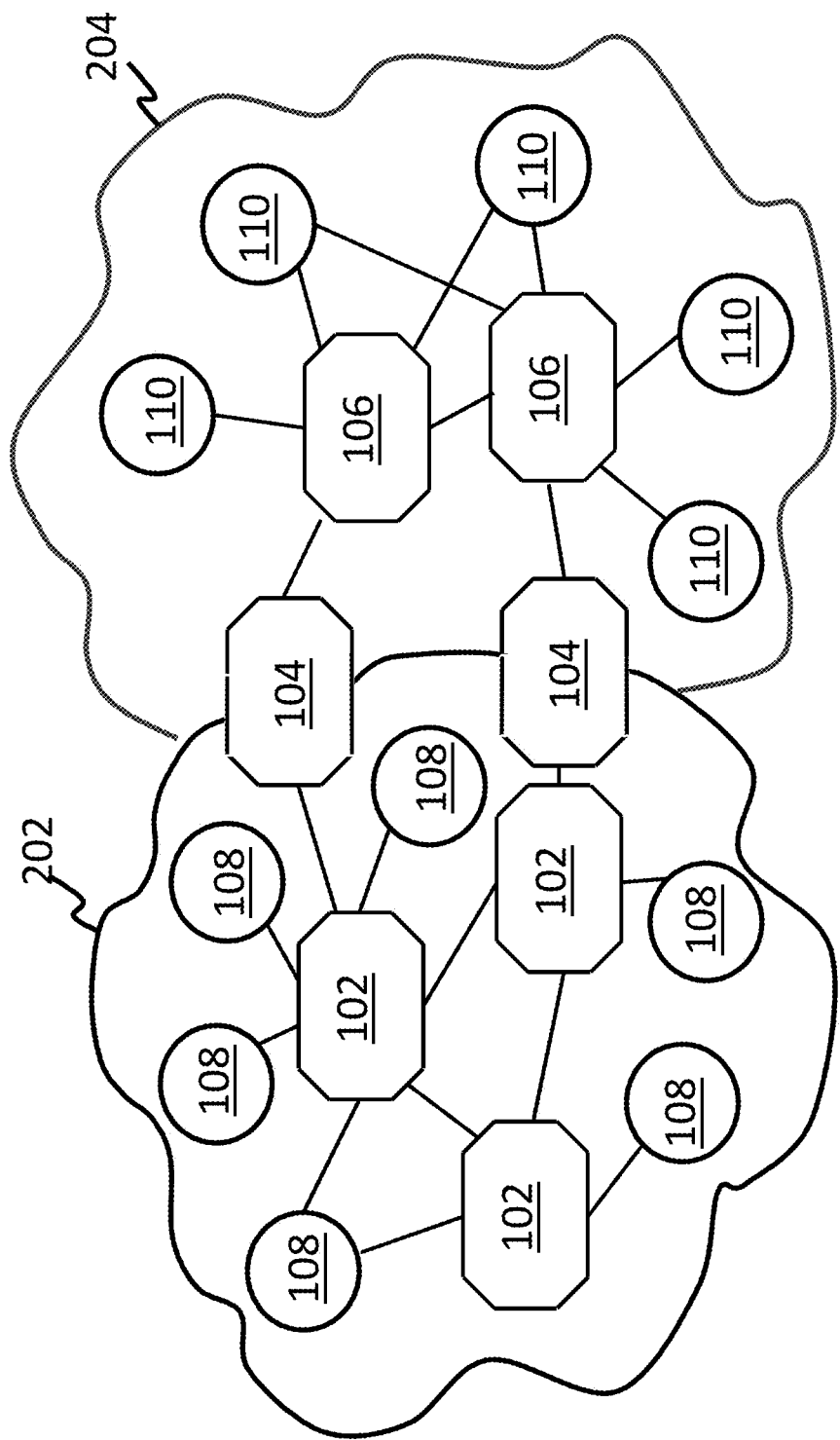
FIG. 1 depicts two IB networks that are in operative communication with one another.

Disclosed herein is a network virtual-channel deadlock free full-routing solution that comprises deadlock avoidance virtual channels that are transparent to the user and that use relatively simple mechanisms inside network switches to prevent deadlock The network may be an InfiniBand network, a network on a chip (NoC), a system on a chip (SoC), or a combination thereof.

The method comprises using a module to create deadlock avoidance virtual channels using virtual lanes. A "module" takes in elements (e.g., a packet of photons) on one input flow and distributes them to several output flows according to established rules. An established rule can be, for example, one incoming element being transmitted to a single output flow. Every packet is assigned by the module to one of the deadlock avoidance virtual channels, as dictated by the virtual channel allocation scheme. The packet will be assigned to a certain virtual channel. Upon traversing the module, the packet will change virtual channels also as dictated by the deadlock avoidance scheme, thus ensuring that deadlock does not occur. This approach is advantageous in that the packet will in principle occupy the same "relative virtual lane" within the intra-virtual-channel group of virtual lanes (ensuring conformity to quality of service setting (QoS settings)). QoS deals mainly with prioritizing certain flows versus others. Examples of modules are source adapters or switches.

The term "intra-virtual-channel group of virtual lanes" is actually the virtual channel (a single one) and the elements of the group are virtual lanes. In short, each virtual channel comprises a plurality of virtual lanes. A plurality of virtual channels where each virtual channel comprises a plurality of virtual lanes is called a set of virtual lanes. Thus in an embodiment, a set of virtual lanes may be partitioned into virtual channels each of which contains a plurality of virtual lanes from the set of virtual lanes. In general, each virtual channel comprises an equal number of virtual lanes. A product of the total number of virtual channels and the total number of virtual lanes in each channel results in the total number of available virtual lanes. The total number of virtual lanes is therefore equal to the total number of physical lanes. As will be detailed later, since the total number of virtual lanes is equal to the total number of physical lanes, these virtual lanes can be mathematically mapped or indexed to the physical lanes.

InfiniBand (IB) is a loss-less fabric, i.e., it does not drop packets during regular operation. Packets are dropped only in instances of component failure. As such, the undesirable effects of retries and timeouts on data center applications are non-existent. It also supports a connection-oriented reliable transport mechanism that is implemented in hardware. This, along with transport window sizes optimized for wire-speed performance, enables very fast reaction times to handle bursty traffic and movement of congestion points.

IB is a commonly used interconnect in supercomputers that comprises host bus adapters and network switches. IB is scalable and uses a switched fabric network topology. In standard IB architecture, the adapters are responsible for placing outgoing packets onto specific virtual lanes in accordance to the packet service class (service lane) and the Quality of Service (QoS) policies in place. Then, in subsequent switch traversals, the packets will typically occupy that same virtual lane until finally being delivered to a destination adapter. Occupying the same virtual lane ensures that quality of service policies are applied correctly but does not stop dependency cycles for occurring in topologies that are susceptible to deadlock. While changing the virtual lane during traversal of a packet is possible in principle (single way of performing the transition per switch per service lane), the originally envisioned use case for this feature is support for heterogeneous switches, that is, switches disposing of a variable number of resources (virtual lanes).

Quality of Service (QoS) is used to address problems of best-effort service, lower bandwidth and high latency seen in ethernet networks. InfiniBand, because of its inherent bandwidth and latency benefits, has been well deployed in high-performance computing applications where high bandwidth and low latency are de-facto requirements. An important feature of any QoS implementation is the concept of traffic classes or flows. A combination of source and destination addresses, source and destination socket numbers, or a session identifier may be used to define a flow or traffic class. Or more broadly, any packet from a certain application, from an incoming interface, or from a certain user or user group can be defined as a flow of traffic class.

InfiniBand Architecture's (IBA) basic unit of communication is a "message". A message may contain between 0 and 2 gigabytes (GB) of data. Messages are segmented into packets. The payload of each packet must contain the maximum number of bytes negotiated for the lane maximum transmission unit (MTU). Segmentation and reassembly of packets is done by IBA hardware and hence MTU size restrictions are not detrimental to performance in anyway. The most common path MTUs are likely to be 256 bytes and 2048 bytes.

Figure 2:
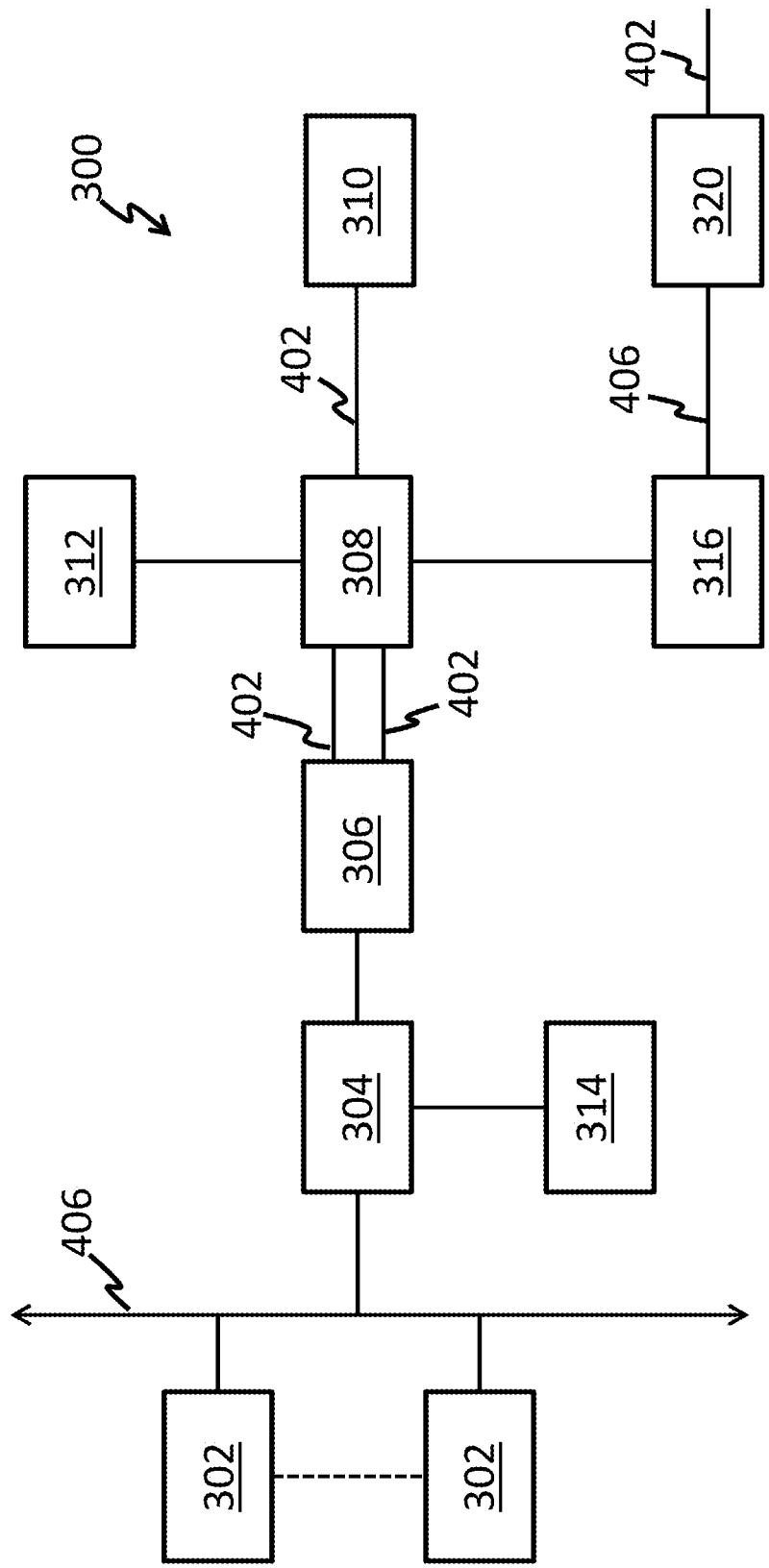
FIG. 2 depicts an IB architecture that comprises switches and adapters.

FIGS. 1 and 2 are schematic diagrams of IB networks. FIG. 1 depicts two IB networks 202 and 204 in operative communication with one another. Operative communication can include electrical communication, optical communication, electromagnetic communication, or a combination thereof. Network 202 comprises a plurality of switches 102 that are in operative communication with end nodes 108 while network 204 comprises a plurality of switches 106 that are in operative communication with end nodes 110. Networks 202 and 204 are in operative communication with one another via routers 104. The routers 104 are in communication with the switches 102 and 106 of networks 202 and 204 respectively.

FIG. 2 depicts another IB architecture that comprises switches and adapters. FIG. 2 shows CPUs 302 in communication with an IB network 300 that comprises a memory center 304, a system memory 314, a host channel adapter (HCA) 306, a fabric switch (hereinafter switch) 308, a target channel adapter (TCA) 310 and 312, and xCA routers 316 and 320. When an IB channel connects with a router or other external network, it uses a channel adapter called an xCA. The HCA resides in the server node and provides the connection between system memory and the IB network. HCA is a network fabric interconnect based on InfiniBand technology and provides a computer with port connection to other InfiniBand devices. That port can be connected to another HCA, a target device, or an InfiniBand switch fabric that redirects the data coming in on one of its ports out to a device attached to another of its ports.

HCA includes a programmable, direct memory access (DMA) processor with address-translation and protection features that allow DMA operation to be initiated either locally or remotely (permitting a source to read or write directly to its target's memory address space). The TCA resides in the storage or I/O device network (such as Ethernet or Fiber Channel) and provides the connection to the IB network.

An IB fabric therefore comprises of a set of host channel adapter (HCAs) interconnected with switches is called a subnet. There can be thousands of subnets in an IB fabric each, in turn, serving thousands of nodes (servers, storage, switches, routers, network analyzers, and other devices). Subnets are interconnected at the higher layer with routers. All IBA packets contain a local route header (LRH) that includes the information necessary to forward a packet through switches. Additionally, a global route header (GRH) is provided that contains the information necessary to forward a packet through IBA routers. With few exceptions, the GRH is only present on packets that are to be routed between subnets.

Modules such as host channel adapters and switches on their port sides implement what are termed as virtual lanes (VL). The virtual lanes to map to independent physical resources, i.e., the number of virtual lanes is the same as the number of physical lanes. The terms "physical lanes" and "virtual lanes" are therefore used interchangeably in this description. A module can be a switch or an adapter. Adapters and switches can also contain modules.

The virtual lanes enable multiple independent data flows from the same link (module) and separate buffering and flow control for each flow. A virtual lane arbiter is used to control the module usage by appropriate data flow.

IBA provides two fields for marking packets with a class of service: the service level (SL) field in the LRH and the traffic class field (TClass) in the GRH. The SL field is a four-bit field that may be arbitrarily used to indicate a class of service. IBA does not define a specific relationship between SL value and forwarding behavior; this is left as deployment policy to enable a wide variety of usage models. There is, however, a defined mechanism in the specification to administratively specify a mapping between the SL values and the available forwarding behaviors in switches. The TClass field is an eight-bit field that serves the same purpose for routers as the SL field does for switches.

At the subnet layer (i.e. switches), IBA defines forwarding mechanisms to support a rich set of behaviors including various options to implement QoS and congestion control. These mechanisms can be divided into three major components: a) Virtual lanes (VL) b) Virtual lane arbitration, and c) Link level flow control. IBA switches may implement between one and 15 virtual lanes. A virtual lane is an independent set of receive and transmit resources (i.e. packet buffers) associated with a port.

In addition to SL, the LRH contains the virtual lanes field that indicates the virtual lane number from which the packet was transmitted. Upon reception, the packet is placed in the port's receive buffer corresponding to the virtual lane indicated by the virtual lane field. As a packet transits the module from input port to output port, the packet may transfer from one virtual lane to another. Each switch in the fabric contains a table (referred to as the SL to VL mapping table) that selects the output port virtual lane based on the packets SL, the port on which the packet was received, and the port to which the packet is destined. This mapping function permits interoperability on fabrics consisting of switches supporting various numbers of virtual lanes. Note that an implication of this is, while the VL indication in a packet may change from hop-to-hop, the SL indication remains constant within a subnet. Note that packets within one virtual lane may pass packets in another virtual lane as they transit a module.

Figure 3:
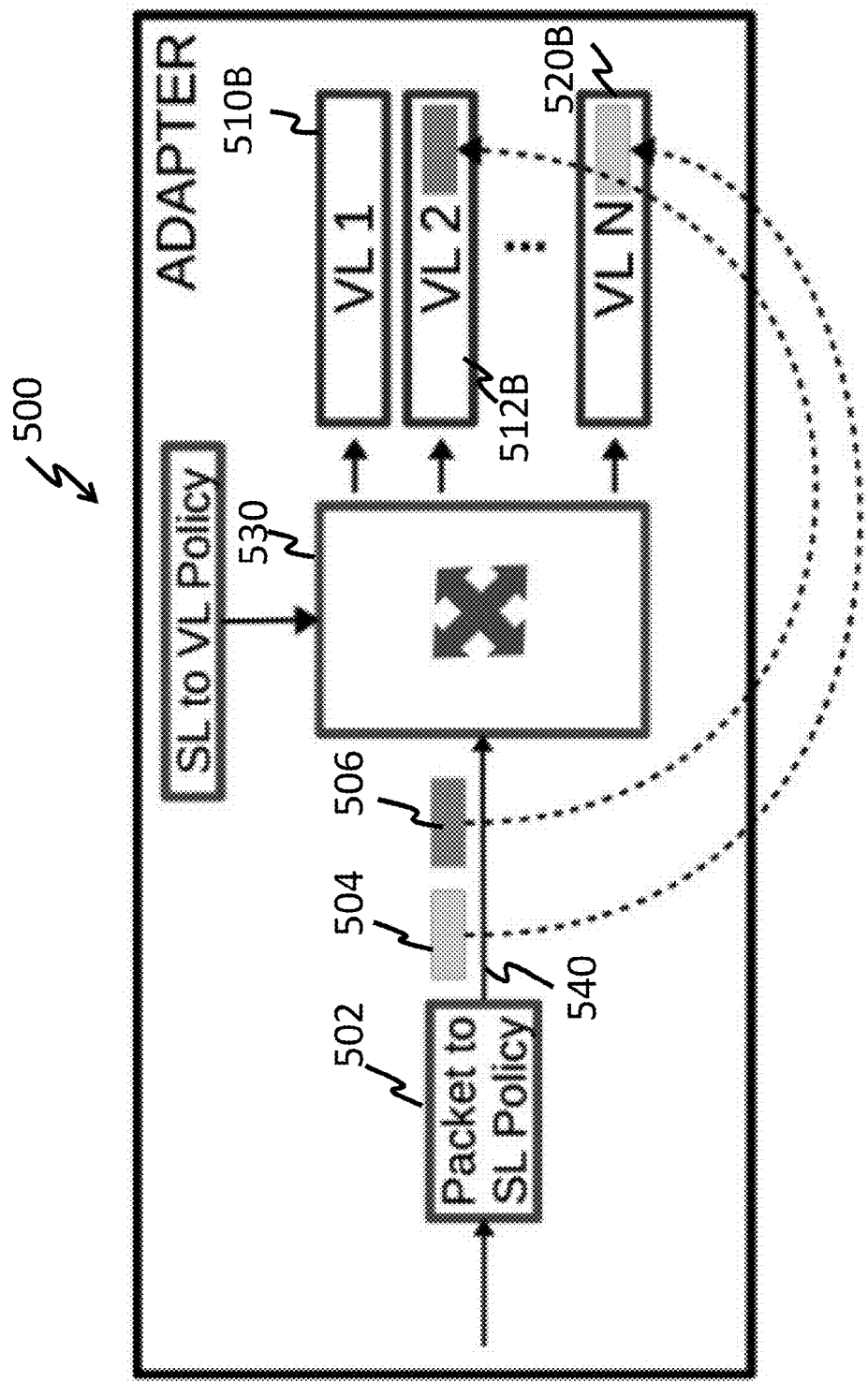
FIG. 3 depicts a standard (HCA) adapter operation for a portion of an IB system.
Figure 4:
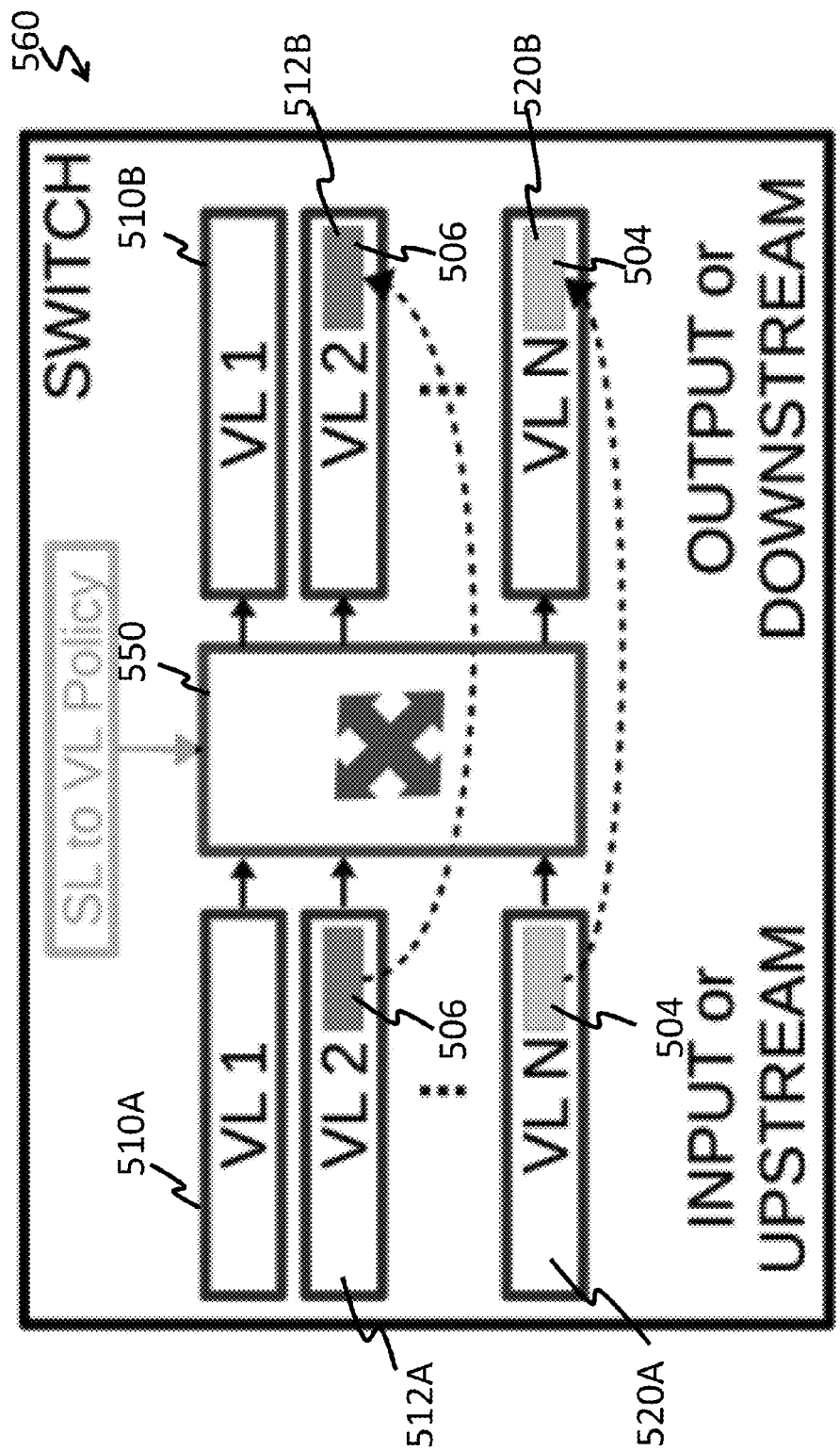
FIG. 4 depicts a standard switch operation for a portion of an IB system.

As noted above, in a standard IB architecture, the (HCAs) adapters are responsible for placing outgoing packets onto specific virtual lanes in accordance to the packet service class (service lane) and the QoS policies in place. FIGS. 3 and 4 depict a portion of an IB system 500 where incoming packets 504, 506, and so on, conforming with service level (SL) policies 502 are directed to virtual lanes VL by virtue of QoS implementations. The IB system comprises a group of "N" virtual lanes VL 1 (510A), VL 2 (512A), and so on to VL N (520A). A first module 530 (see FIG. 3) and a second module 550 (see FIG. 4) ensure that the packets 504, 506, and so on, occupy the same virtual lane until finally being delivered to the destination adapter (not shown).

The FIG. 3 depicts a standard module 500 (e.g., an adapter) operation for the travel of packets 504, 506, and so on, that are being transmitted along stream 540. The packets 504, 506, and so on, are transmitted in the stream 540 in accordance with the "packet to service lane" policy 502. FIG. 3 is meant to illustrate that packets coming from the on stream 540 get assigned a service lane (SL) and then based on the service lane get assigned to a virtual lane (VL). The packets 504, 506, and so on, are assigned from the service lane to the virtual lane using SL to VL policy 530.

The module 530 enforces the service lane to virtual lane QoS policy that directs the packages to the N virtual lanes 510B, 512B, and so on, to 520B on the port side of the module as per the dictates of the QoS policy. Packet 504 is delivered to virtual lane N (VLN) 520B, while packet 506 is delivered to virtual lane 2 (VL2) 512B.

FIG. 4 depicts another module 560 (e.g., a switch) and shows the travel of packets 504, 506, and so on, after being directed by the QoS policy to virtual lanes 510A to 520A from the FIG. 3. In the FIG. 4, the incoming virtual lanes are numbered 510A, 512A, and so on to 520A (see input or upstream side of the module 550), while the outgoing virtual lanes are numbered 510B, 512B, and so on to 520B (see output or downstream side of the module 550). The virtual lanes 510A to 520A are meant to represent either i) the input side of the module 500 or, should the module not have an input side and be solely output buffered, ii) the output side of the upstream network module (switch or adapter) that is linked to switch 500. Similarly for 510B to 520B, they are either the output side of module 500 or, should module 500 not have an output side (purely input buffered switch), the input side of the downstream network module (switch or adapter) to which module 500 is linked.

The module 550 enforces service lane to virtual lane QoS policies and directs that the packets stay in their respective lanes after travel through the module 550. For example, packet 506 travels along lane 512A prior to module 550 and is directed to lane 512B after module 550. Similarly packet 504 travels along lane 520A prior to module 550 and stays in lane 520B after module 550. Thus in the standard mode of InfiniBand network switch and adapter operation, the respective packets occupy the same virtual lane in conjunction with QoS policies. A drawback of this mode of InfiniBand operation is that while occupying the same virtual lane ensures that quality of service policies are applied correctly it does not stop dependency cycles for occurring in topologies that are susceptible to deadlock.

Figure 5:
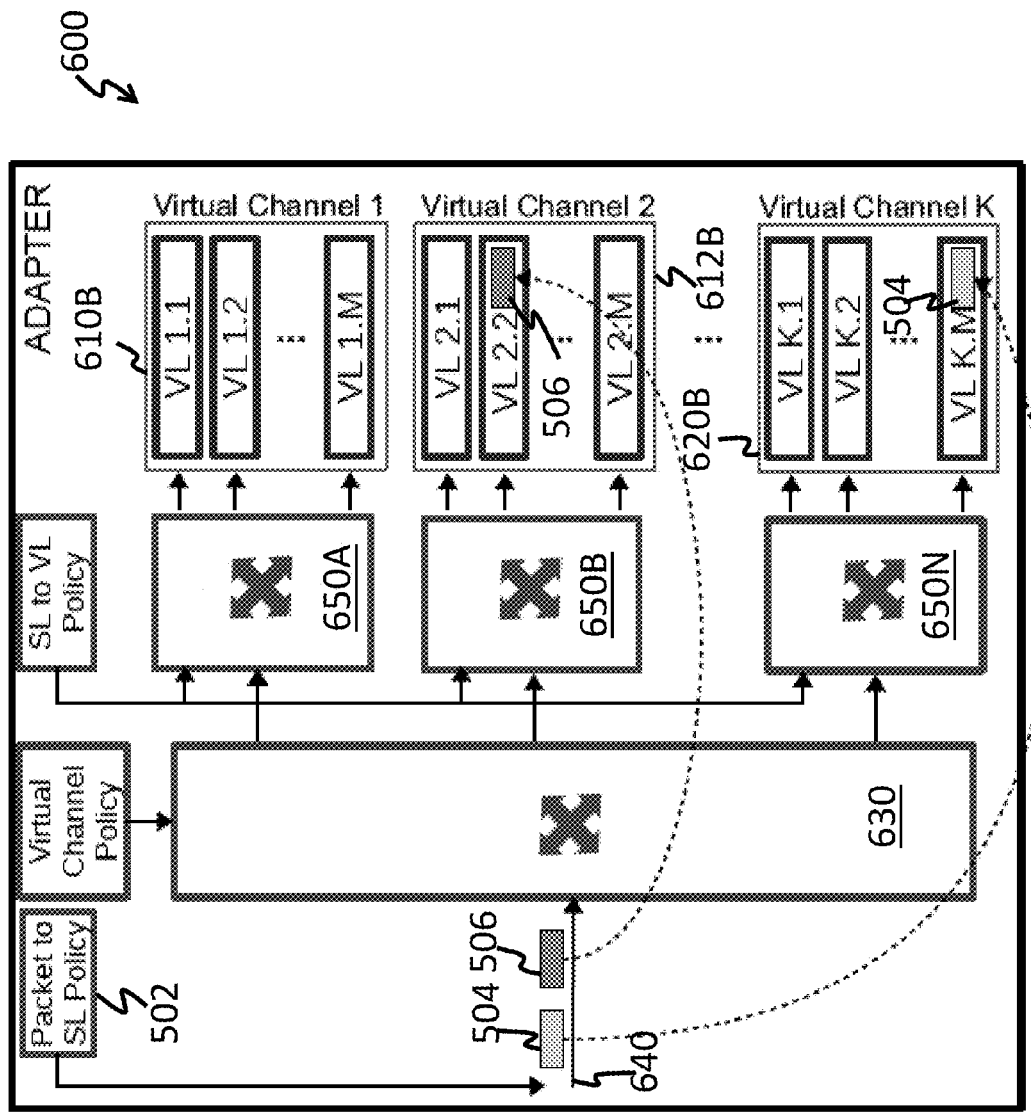
FIG. 5 depicts an adapter as well as the adapter operation for a portion of the IB system that includes deadlock avoidance channels.
Figure 6:
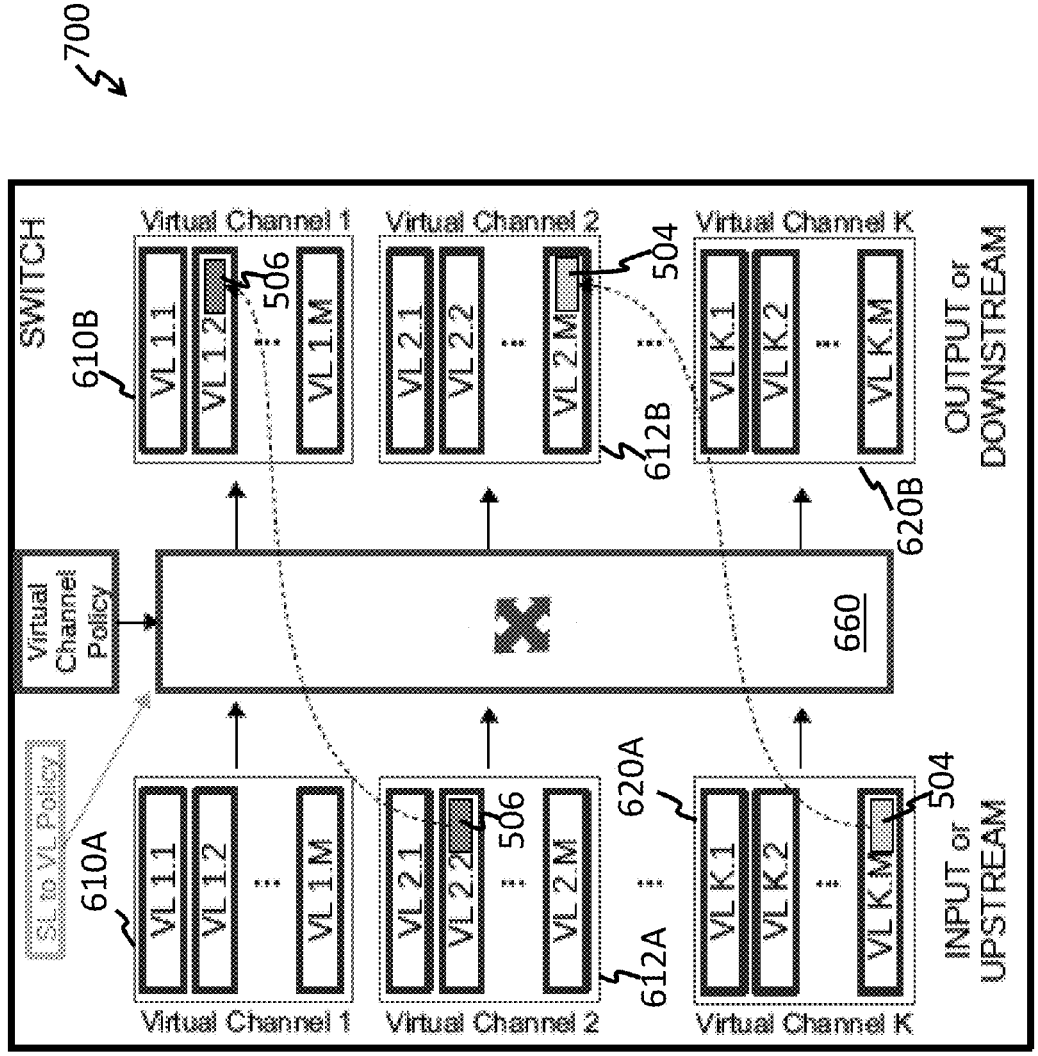
FIG. 6 depicts a switch as well as switch operation for a portion of the IB system that includes deadlock avoidance channels.

Deadlock avoidance in an InfiniBand network is facilitated by the embodiments depicted in the FIGS. 5 and 6. FIG. 5 depicts a module as well as the module operation for a portion of the IB system 600 and shows the travel of a plurality of packets 504, 506, and so on, that are being transmitted along incoming service lane 640. The module comprises a set of virtual lanes that are partitioned into deadlock avoidance virtual channels, where each channel is partitioned into virtual lanes. As can be seen in the FIGS. 5 and 6, the virtual channels 610B, 612B . . . 620B each comprise virtual lanes numbered 1 . . . M. From the FIG. 5, the nomenclature used for virtual lane indexing in virtual channel 1 (VL1) (also numbered 610B) is from 1 to M. Similarly, each channel has M virtual lanes indexed 1 to M. Thus for virtual channel 1 (VL1), the indexing is denoted as VL 1.1 for virtual lane 1 in virtual channel 1, VL 1.2 for virtual lane 2 in virtual channel 1, and VL1.M for virtual lane M in virtual channel 1.

For virtual channel 2 (VL2), the indexing is denoted as VL2.1 for virtual lane 2 in virtual channel 1, VL2.2 for virtual lane 2 in virtual channel 2, and VL2.M for virtual lane M in virtual channel 2. There are K channels in the system and therefore for virtual channel K (VLK) the indexing is denoted as VLK.1 for virtual lane 1 in virtual channel K, VLK.2 for virtual lane 2 in virtual channel K, and VLK.M for virtual lane M in virtual channel K.

In short, the system can include two types of indexing—an absolute index and a relative index. In a module with N virtual lanes, partitioned into K virtual channels with M virtual lanes each (so that N=K*M virtual lanes), the absolute indexing would be 1, 2, 3, . . . , M−1, M, M+1, M+2, . . . , 2M, . . . N (a series of integers ranging from 1 to N, where N is the total number of virtual lanes in the module), whereas the relative indexing would be 1, 2, 3, . . . , M−1, M, 1, 2, . . . , M, 1, M, (K virtual channels with each channel having 1 to M virtual lanes resulting in a total of N virtual lanes). Absolute indexing pertains to the physical channels while the relative indexing pertains to the virtual channels.

The set of N virtual lanes 610B, 612B, and so on, to 620B are thus organized into K virtual channels. The number of deadlock avoidance virtual channels are determined by the system topology. In an embodiment, in an IB architecture with N virtual lanes and a system topology that uses K deadlock avoidance virtual channels per lane, partitioning the N virtual lanes into K groups, produces M=N/K lanes per virtual channel. A user is then (for QoS purposes) exposed to only M virtual lanes which the user can configure as a standard IB system with M lanes. When a packet is assigned in the source adapter to virtual lane i (1<=i<=M) of the M virtual lanes according to the QoS policy and to a virtual channel v (1<=v<=K) according to the deadlock avoidance scheme, it will be assigned to the physical virtual lane with absolute index j=i+M*(v−1).

This can be seen in FIG. 5 for an adapter in an IB system, where packets 504 and 506 are directed to the module 630 which enforces the virtual channel policy and modules 650A, 650B and 650C, which enforce the service lane to virtual lane policy. From there the packet 506 is directed to virtual channel 612B into virtual lane 2 and packet 504 is directed to virtual lane M in virtual channel 620B. It is to be noted that the direction of the packet 506 to virtual lane 2 (VL2.2) and the direction of packet 504 to virtual lane M (VLK.M) is the same as that shown in the FIG. 3. In other words, the creation of deadlock avoidance virtual channels results in the respective packet 506 and 504 occupying the same "relative virtual lanes" 2 and M within the group of the new deadlock avoidance virtual channel (ensuring conformity to QoS settings) but the transition to the group ensures that no deadlock cycle will occur.

Within each switch 700 (see FIG. 6) that the packet will traverse on its way to the destination, the packet can potentially change the virtual lane it occupies as described below. Given a packet incoming on the physical virtual channel with absolute index j (corresponding to QoS virtual lane i (i=1+(j−1)% M), where % stands for the modulo operation, i.e., the remainder in integer division) within the virtual lane group of deadlock avoidance virtual channels v (v=(j−1)/M, where "/" signifies the quotient in integer division) and given a deadlock avoidance scheme transition rule in the current module that states that packets coming into that port on deadlock virtual channel v need to switch to deadlock virtual channel u, the packet will need to occupy in the current module the virtual lane with absolute index j'=j+(u−v)*M. What this translates to is that the packet will occupy the same "relative virtual lane" i within the group of the new deadlock avoidance virtual channel u (ensuring conformity to QoS settings) but the transition to the group ensures that no deadlock will occur. Should there additionally exist a configuration, via the intra-module service lane to virtual lane mapping, of a transition of the packet from QoS virtual lane i to a different, arbitrary, QoS virtual lane i', then the packet will occupy the virtual lane with absolute index j"=i'+u*(M−1).

In another aspect, this disclosure is directed to methods that ensure that the QoS settings of the switch are enforced in this new setting. As detailed above, the architecture change is transparent to the user and thus the switch simply receives a quota/priority QoS setting for the M virtual lanes that are exposed to the user. This means that the policy only regulates how access to the link should be arbitrated between links belonging to the same deadlock avoidance virtual channel. In one embodiment, a round robin pointer is used to facilitate access across all the virtual channels. In an embodiment, the round robin pointer is used to first select the deadlock avoidance virtual channel to be served next. This ensures both that the QoS policy is enforced and that individual deadlock avoidance virtual channels receive equal access to the shared link. The round robin pointer regulates the transition from module (adapter/switch) virtual channels to the actual link outgoing from them. As there are several virtual lanes that access the module, an arbitration policy is desirable, and this is what the round robin pointer solves.

Round-robin refers to a pattern or ordering whereby items are encountered or processed sequentially, often beginning again at the start in a circular manner.

FIG. 6 shows the transmission of packets 504 and 506 across a module 600 (e.g., a switch) in an exemplary IB system. In the module 600, packets 504 and 506 are directed by the virtual channel policy 660 from virtual channel 620A (VLK.M) and virtual lane 612A (VL2.2) respectively to virtual channel 612B (VL2.M) and virtual channel 610B (VL1.2). Once again, it can be seen that the creation of deadlock avoidance virtual channels results in the respective packet 506 and 504 occupying the same "relative virtual lanes" 2 and M within the group of the new deadlock avoidance virtual channel (ensuring conformity to QoS settings) but the transition to the group ensures that no deadlock cycle will occur.

As detailed above, the scheme disclosed herein is advantageous in that packets will occupy the same "relative virtual lane" within the group of the new deadlock avoidance virtual channels.

This disclosure also encompasses a computer program product comprising a non-transitory storage medium readable by a processing circuit and storing instructions for execution by the processing circuit for performing a method for deadlock avoidance in a network comprising partitioning virtual lanes into deadlock avoidance virtual channels; and assigning each incoming packet to one of the deadlock avoidance virtual channels in a virtual lane that corresponds to the physical virtual lane that the packet would have travelled along if the network contained no deadlock avoidance virtual channels and as many physical virtual lanes as there are in each virtual channel; and transitioning each packet as it traverses the network from one deadlock virtual channel to another when the deadlock avoidance policy so demands it.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method for avoiding deadlock in a network comprising:
    a virtual channel policy module of a network adaptor partitioning one or more incoming service lanes into N service lanes, wherein each of the N service lanes comprises a corresponding service lane to virtual lane policy module of the network adaptor, where N is a positive integer;
    the virtual channel policy module of the network adaptor partitioning the N service lanes into K deadlock avoidance virtual channels, wherein each deadlock avoidance virtual channel comprises M virtual lanes, and wherein K and M are independent positive integers;
    the virtual channel policy module of the network adaptor assigning each incoming packet at the network adaptor to one of K deadlock avoidance virtual channels, and within the deadlock avoidance virtual channel to a virtual lane whose relative index corresponds to an absolute index of the service lane the packet would have been assigned to if the network was not provisioned with K deadlock avoidance virtual channels; and
    the virtual channel policy module of the network adaptor transitioning each packet as it traverses the network adaptor from one deadlock avoidance virtual channel to another deadlock avoidance virtual channel when a deadlock avoidance policy so demands it.

2. The method of claim 1, wherein when a particular incoming packet is assigned by the virtual channel policy module of the network adaptor to virtual lane i ($1 \le i \le M$) of the M virtual lanes and to a deadlock avoidance virtual channel v ($1 \le v \le K$) according to a deadlock avoidance scheme, it will be assigned to a physical virtual lane with absolute index $j=i+M*(v-1)$.

3. The method of claim 2, wherein when the particular incoming packet arriving at the network adaptor on physical virtual lane with absolute index j that belongs to deadlock avoidance virtual channel v ($v=(j-1)/M$)) and is subject to the deadlock avoidance scheme transition rule in the network adaptor that states that packets arriving at the network adaptor on deadlock avoidance virtual channel v need to switch to deadlock virtual channel u, then the particular incoming packet will transition to the virtual lane with absolute index $j'=j+(u-v)*M$ in the network adaptor.

4. The method of claim 3, wherein the particular incoming packet arriving at the network adaptor on physical virtual lane having absolute index j that belongs to deadlock avoidance virtual channel v ($v=(j-1)/M$)) and subject to a deadlock avoidance scheme transition rule that states that packets arriving on deadlock avoidance virtual channel v need to switch to deadlock avoidance virtual channel u, and wherein furthermore the network is configured via a service lane to virtual lane mapping of the network adaptor to transition that particular packet to virtual lane i', then the particular incoming packet will transition to the virtual lane with absolute index $j''=i'+u*(M-1)$ in the network adaptor.

5. The method of claim 3, wherein the particular packet arriving at the network adaptor on physical virtual lane j that belongs to deadlock avoidance virtual channel v ($v=(j-1)/M$) corresponds to an intra-virtual-channel virtual lane with relative index i where $i=1+(j-1)\% M$; where % stands for a modulo operation.

6. The method of claim 1, further comprising a round robin pointer that regulates the transition of the packets from the deadlock avoidance virtual channels in a module to an actual link outgoing from the network adaptor.

7. The method of claim 1, wherein the network adaptor comprises a switch.

8. A computer program product for avoiding deadlock in a network comprising:
    a non-transitory storage medium readable by a network adaptor and-storing computer executable instructions for execution by a processor of the network adaptor for performing a method for avoiding deadlock in a network comprising:
    a virtual channel policy module of the network adaptor partitioning one or more incoming service lanes into N service lanes, wherein each of the N service lanes comprises a corresponding service lane to virtual lane policy module of the network adaptor, where N is a positive integer;
    the virtual channel policy module of the network adaptor partitioning the N service lanes into K deadlock avoidance virtual channels, wherein each deadlock avoidance virtual channel comprises M virtual lanes, and wherein K and M are independent positive integers;
    the virtual channel policy module of the network adaptor assigning each incoming packet at the network adaptor to one of K deadlock avoidance virtual channels, and within the deadlock avoidance virtual channel to a virtual lane whose relative index corresponds to an absolute index of the service lane the packet would have been assigned to if the network was not provisioned with K deadlock avoidance virtual channels; and
    the virtual channel policy module of the network adaptor transitioning each packet as it traverses the network adaptor from one deadlock avoidance virtual channel to another deadlock avoidance virtual channel when a deadlock avoidance policy so demands it.

9. The computer program product of claim 8, wherein when a particular incoming packet is assigned by the virtual channel policy module of the network adaptor to virtual lane i ($1 \le i \le M$) of the M virtual lanes and to a deadlock avoidance virtual channel v ($1 \le v \le K$) according to a deadlock avoidance scheme, it will be assigned to a physical virtual lane $j=i+M*(v-1)$.

10. The computer program product of claim 9, wherein when the particular incoming packet arriving at the network adaptor on physical virtual lane with absolute index j that belongs to deadlock avoidance virtual channel v ($v=(j-1)/M$)) and subject to the deadlock avoidance scheme transition rule in the network adaptor that states that packets arriving at the network adaptor on deadlock avoidance virtual channel v need to switch to deadlock virtual channel u, then the particular incoming packet will transition to the virtual lane with absolute index $j'=j+(u-v)*M$ in the network adaptor.

11. The computer program product of claim 10, wherein the particular packet arriving at the network adaptor on physical virtual lane j that belongs to deadlock avoidance virtual channel v ($v=(j-1)/M$) corresponds to an intravirtual-channel virtual lane with relative index i where $i=1+(j-1) \% M$; where % stands for a modulo operation.

12. The computer program product of claim 9, wherein the particular incoming packet arriving at the network adaptor on physical virtual lane having absolute index j that belongs to deadlock avoidance virtual channel v ($v=(j-1)/M$)) and subject to a deadlock avoidance scheme transition rule that states that packets arriving on deadlock avoidance virtual channel v need to switch to deadlock avoidance virtual channel u, and wherein furthermore the network is configured via a service lane to virtual lane mapping of the network adaptor to transition that particular packet to virtual lane i', then the particular incoming packet will transition to the virtual lane with absolute index $j''=i'+u*(M-1)$ in the network adaptor.

13. The computer program product of claim 8, further comprising a round robin pointer that regulates the transition of the packets from the deadlock avoidance virtual channels in a module to an actual link outgoing from the network adaptor.

14. A network system comprising:
a network adaptor having:
one or more incoming service lanes;
a virtual channel policy module;
N service lane to virtual lane policy modules,
a processor; and
a non-transitory storage medium storing computer executable instructions for execution by the processor of the network adaptor for performing a method for avoiding deadlock in a network, comprising:
the virtual channel policy module of the network adaptor partitioning one or more incoming service lanes into N service lanes, wherein each of the N service lanes comprises a corresponding service lane to virtual lane policy module of the network adaptor, where N is a positive integer;
the virtual channel policy module of the network adaptor partitioning the N service lanes into K deadlock avoidance virtual channels, wherein each deadlock avoidance virtual channel comprises M virtual lanes, and wherein K and M are independent positive integers;
the virtual channel policy module of the network adaptor assigning each incoming packet at the network adaptor to one of K deadlock avoidance virtual channels, and within the deadlock avoidance virtual channel to a virtual lane whose relative index corresponds to an absolute index of the virtual lane the packet would have been assigned to if the network was not provisioned with K deadlock avoidance virtual channels; and
the virtual channel policy module of the network adaptor transitioning each packet as it traverses the virtual channel policy module from one deadlock avoidance virtual channel to another deadlock avoidance virtual channel when a deadlock avoidance policy so demands it.

15. The network system of claim 14, wherein when a particular incoming packet is assigned by the virtual channel policy module of the network adaptor to virtual lane i ($1 \le i \le M$) of the M virtual lanes and to a deadlock avoidance virtual channel v ($1 \le v \le K$) according to a deadlock avoidance scheme, it will be assigned to a physical virtual lane $j=i+M*(v-1)$.

16. The computer program product of claim 15, wherein when the particular incoming packet arriving at the virtual channel policy module of the network adaptor on physical virtual lane with absolute index j that belongs to deadlock avoidance virtual channel v ($v=(j-1)/M$)) and subject to the deadlock avoidance scheme transition rule in the virtual channel policy module that states that packets arriving at the network adaptor on deadlock avoidance virtual channel v need to switch to deadlock virtual channel u, then the particular incoming packet will transition to the virtual lane with absolute index $j'=j+(u-v)*M$ in the network adaptor.

17. The computer program product of claim 16, wherein the particular incoming packet arriving at the network adaptor on physical virtual lane having absolute index j that belongs to deadlock avoidance virtual channel v ($v=(j-1)/M$)) and subject to the deadlock avoidance scheme transition rule that states that packets arriving on deadlock avoidance virtual channel v need to switch to deadlock avoidance virtual channel u, and wherein furthermore the network is configured via a service lane to virtual lane mapping of the network adaptor to transition that particular packet to virtual lane i', then the particular incoming packet will transition to the virtual lane with absolute index $j''=i'+u*(M-1)$ in the network adaptor.

* * * * *